INVENTORS
ROBERT A. HAYES
BY WILLARD C. RYKERT
ATTORNEY

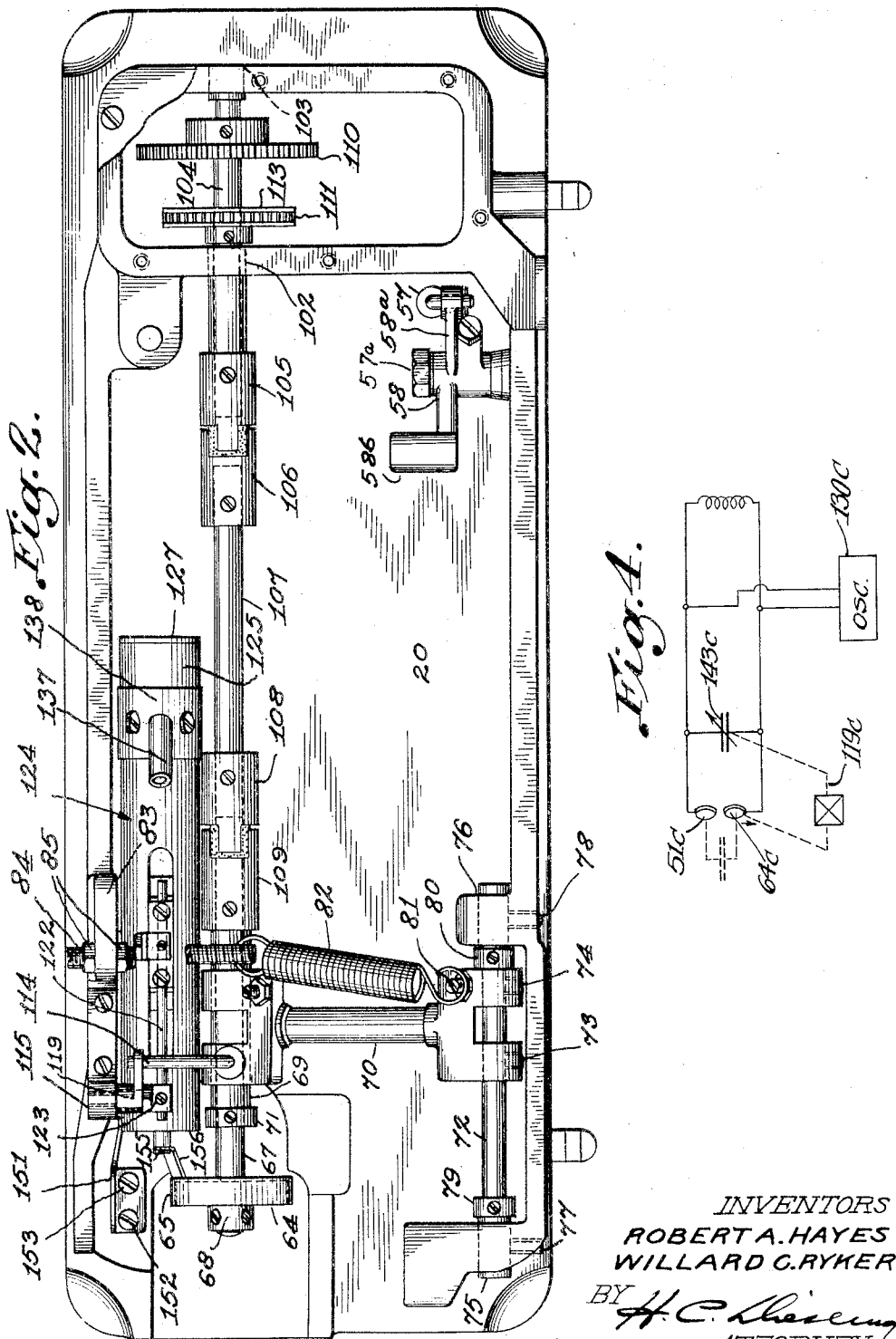

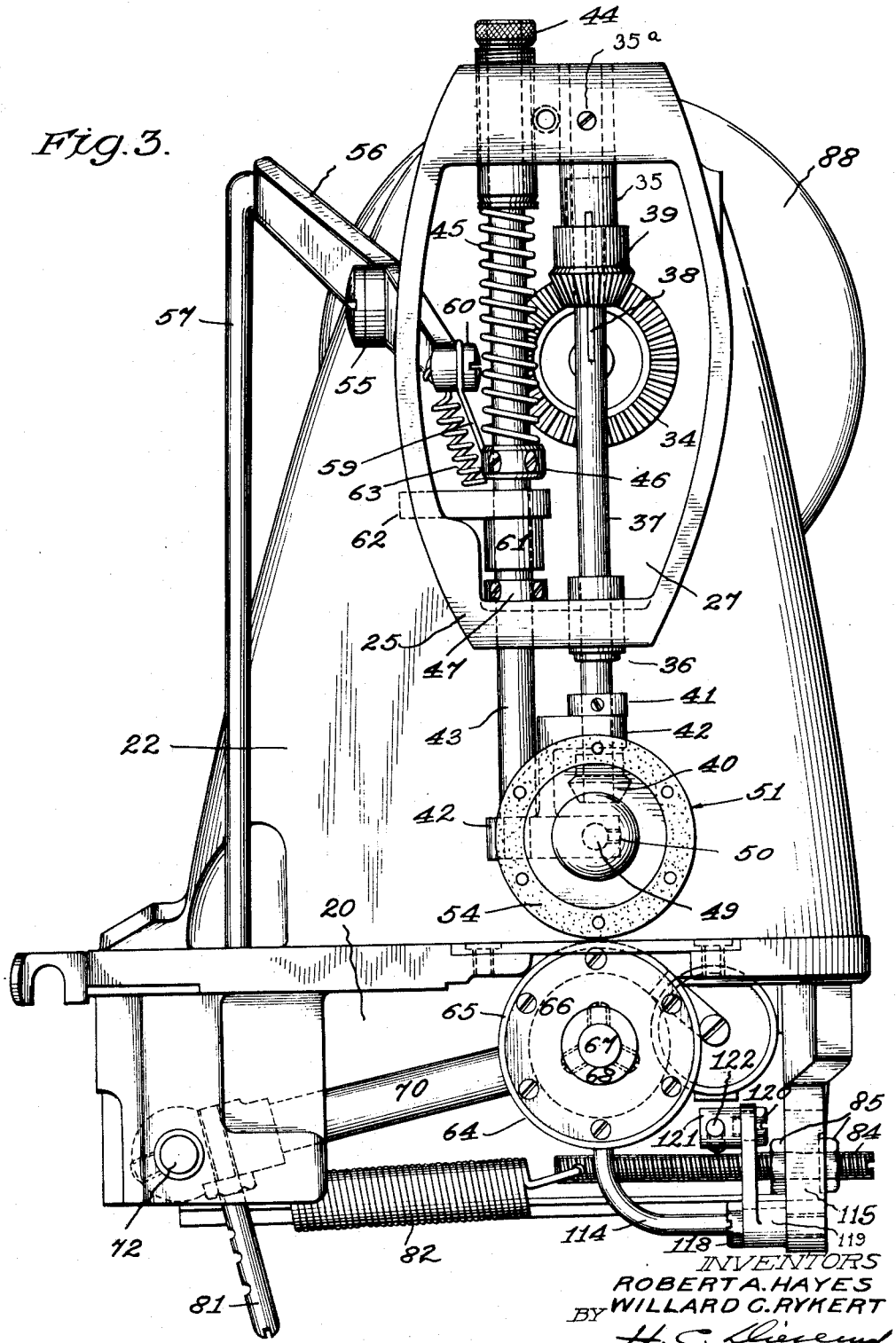

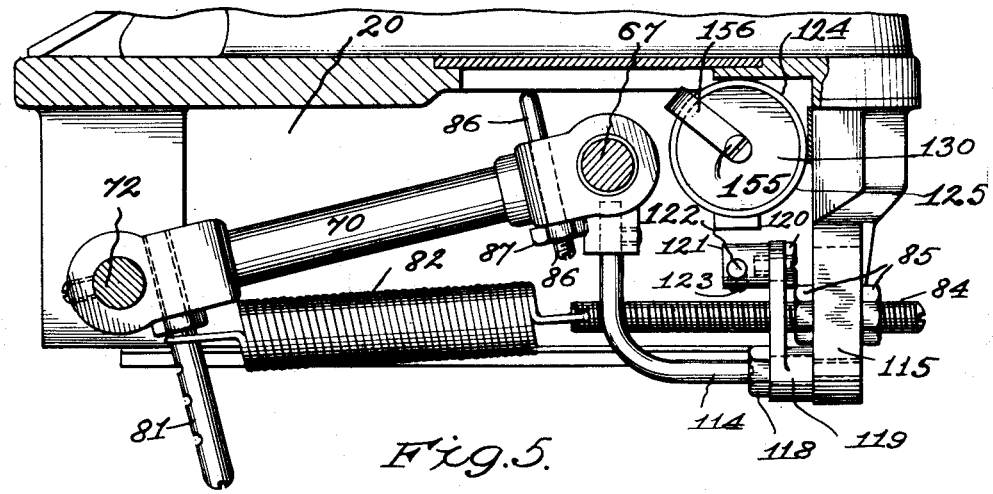
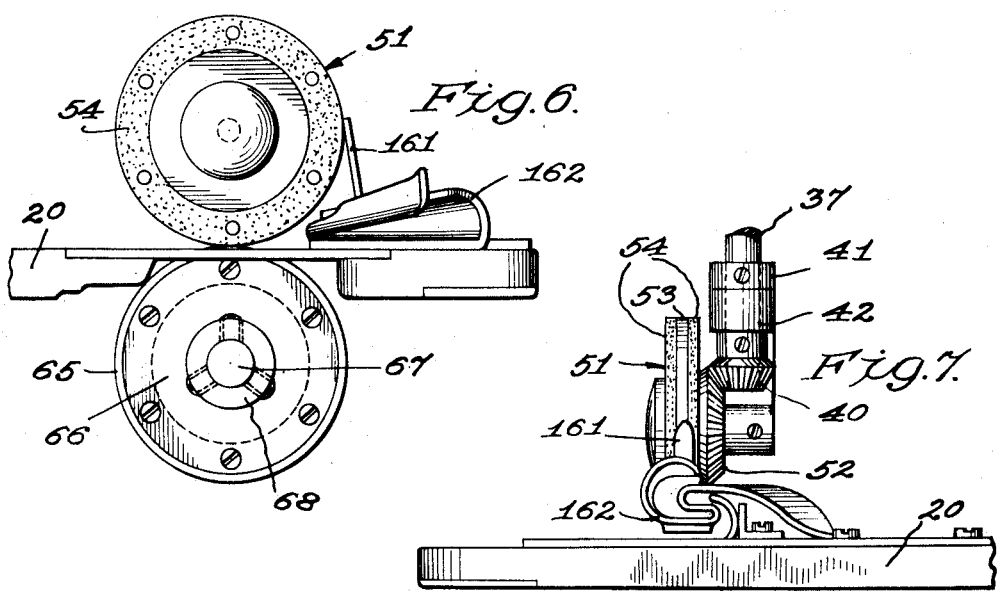
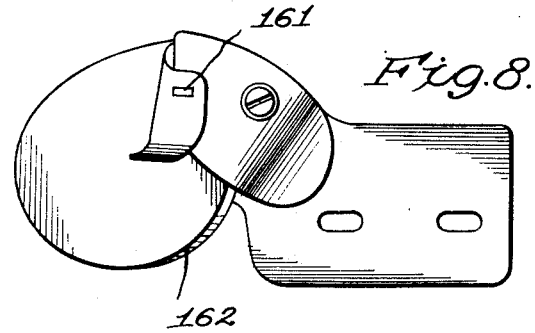

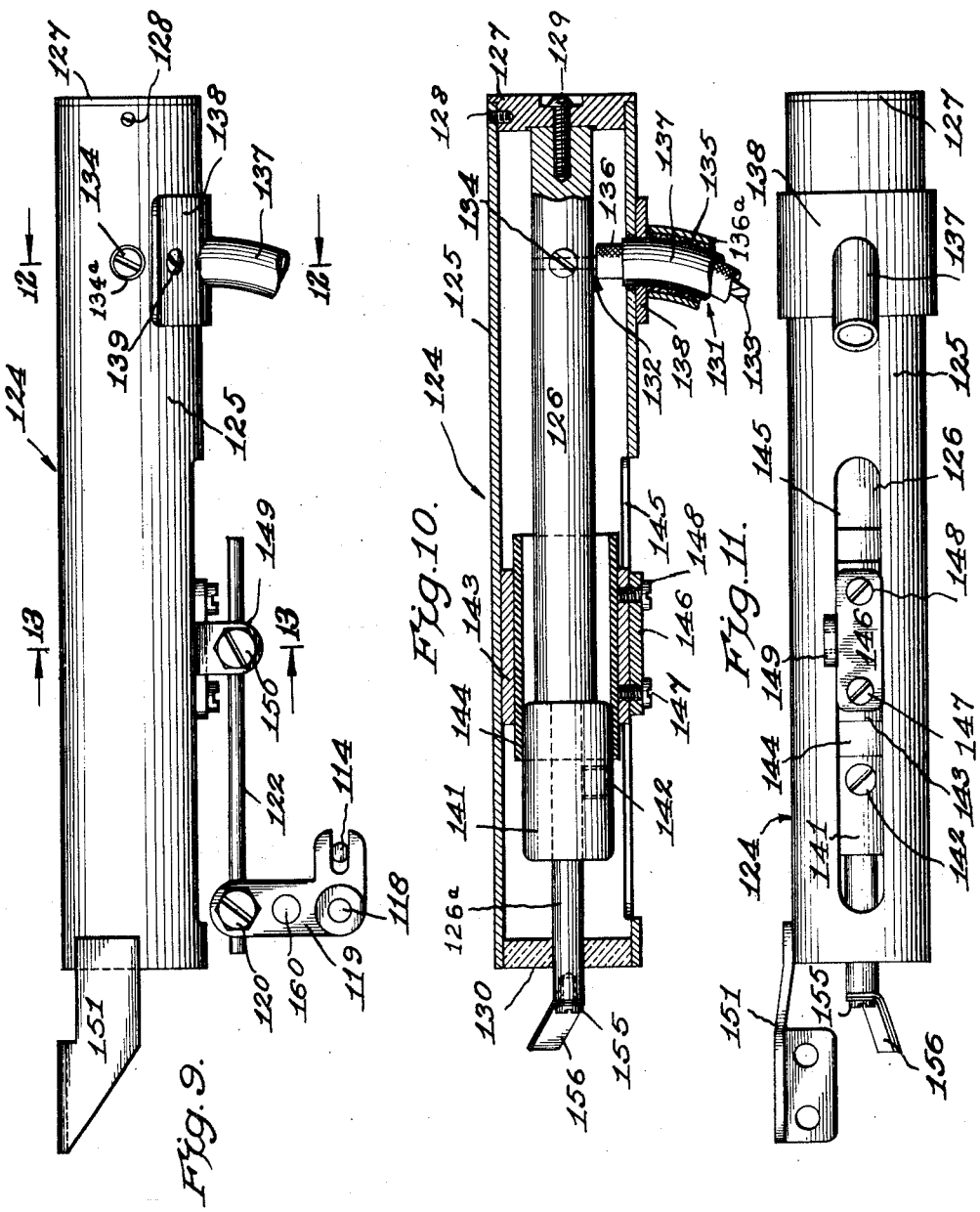

Sept. 19, 1950 R. A. HAYES ET AL 2,522,823
AUTOMATIC TUNING OF HIGH-FREQUENCY
ELECTRICAL SEAMING APPARATUS
Filed April 16, 1946 7 Sheets-Sheet 6
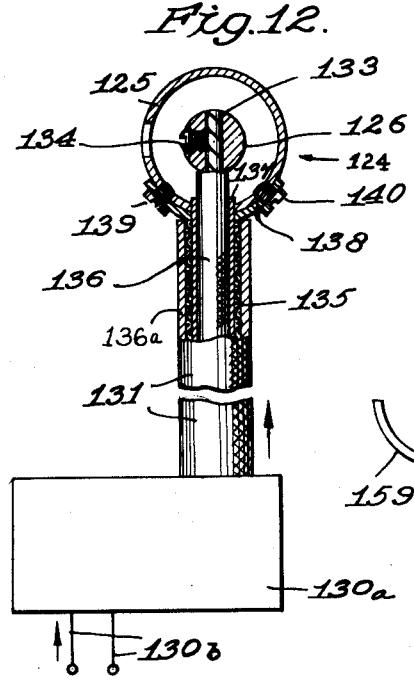
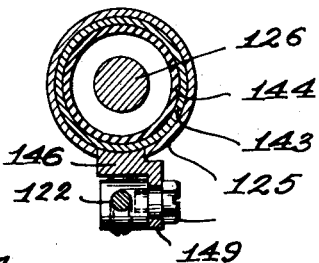
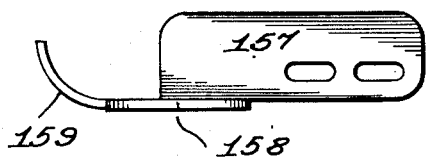
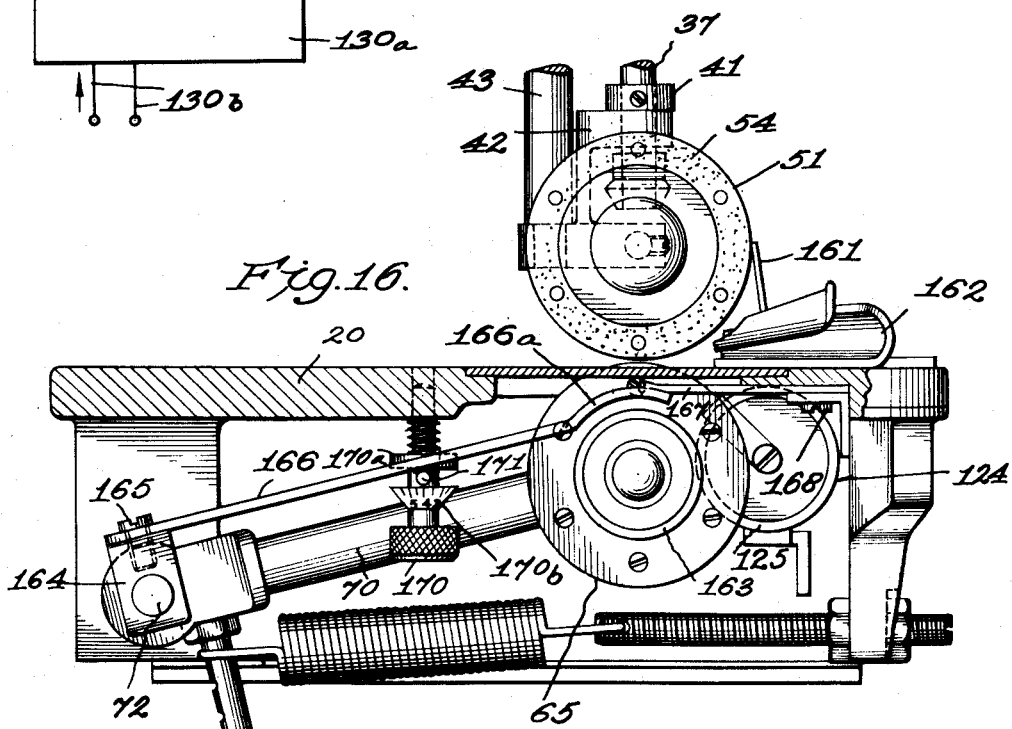
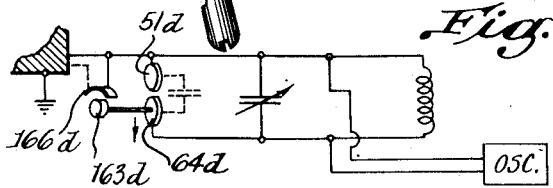
INVENTORS
ROBERT A. HAYES
BY WILLARD C. RYKERT
ATTORNEY

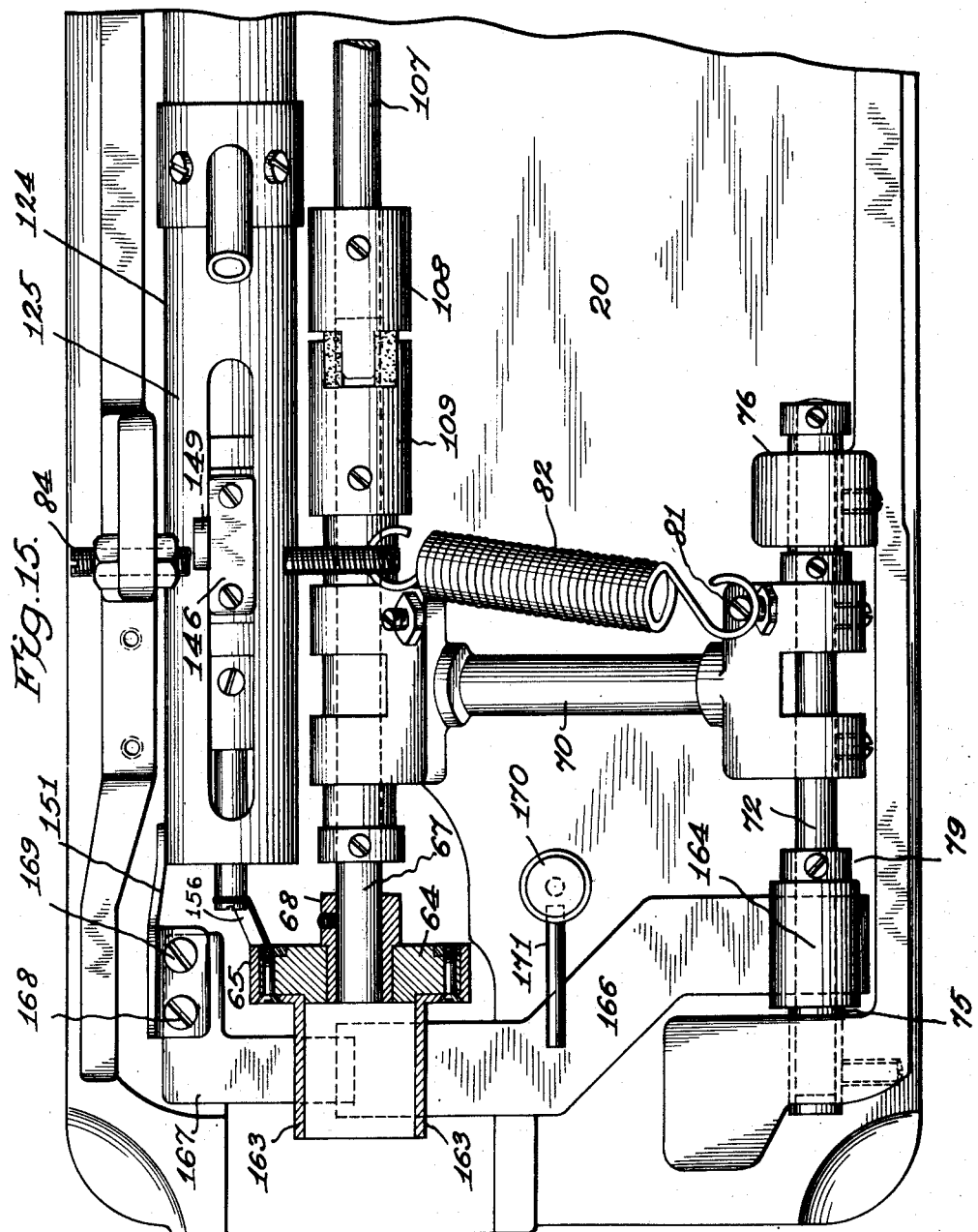

Patented Sept. 19, 1950

2,522,823

UNITED STATES PATENT OFFICE 2,522,823

AUTOMATIC TUNING OF HIGH-FREQUENCY ELECTRICAL SEAMING APPARATUS

Robert A. Hayes, Franklin Park, and Willard C. Rykert, Hinsdale, Ill., assignors to Union Special Machine Company, Chicago, Ill., a corporation of Illinois Application April 16, 1946, Serial No. 662,422

7 Claims. (Cl. 219—47)

This invention relates to apparatus and a method for seaming or bonding together parts with the aid of a high frequency electric field. More specifically, it relates to apparatus of this type for seaming sheets of dielectric material, such as plastic film, at least one of which becomes plastic and tacky when heated.

The present invention is especially applicable for forming a continuous seal between parts and its advantages are particularly apparent in case there are variations in the thickness of the parts being sealed. Prior to the present invention, such variations have represented a considerable difficulty. For example, in electronic seaming operations, while assembling a garment from various plastic parts, at those points where the seam being formed crosses other seams, the aggregate thickness of the material is greater than in other regions. In order to soften the material sufficiently to form a satisfactory seal, more power is required at such points than in others. If the power is set at a value which would be satisfactory for thick regions, it may be too great for thinner regions, and the film may be softened too much in these regions. There is a further difficulty in that variations in the aggregate thickness of the material being seamed not only require a different power output, but also these variations, or changes in the load, themselves affect the power output. Prior to the present invention it has been necessary for the operator to make manual adjustments in the apparatus in order to regulate the power output in connection with changes in the aggregate thickness of the material being seamed.

An object of the present invention is to enable the operator to seam various thicknesses of various numbers of plies of a given material without the necessity of regulating the power output manually.

A feature of the present invention is the provision of means responsive to the aggregate thickness of the parts being bonded for automatically controlling the power supplied to said parts.

A further and more specific object is to provide electronic seaming apparatus having a tunable coupling means for transmitting energy from a high frequency source to the parts and means automatically responsive to the aggregate thickness of said parts for varying the rate at which energy is transmitted to said parts by controlling the tuning of said coupling means.

Another feature of the present invention is the provision of two opposed yielding electrodes one of which has less tension than the other. The yielding electrode having the least tension is intended to yield with variations in thickness of the work between the electrodes, and its motion may be used to control the power output of the apparatus, while the yielding electrode with the greatest tension is intended to be moved by the operator for the introduction or removal of work from the machine.

The above-mentioned, as well as other objects, together with the many advantages obtainable by the practice of the present invention, will be readily comprehended by persons skilled in the art by reference to the following detailed description taken in connection with the annexed drawings which respectively describe and illustrate a preferred embodiment of the invention, and wherein Fig. 1 is a front view of the machine, partly in elevation and partly in section, with certain parts broken away for clarity of illustration.

Fig. 2 is a view of the machine from underneath same.

Fig. 3 is an elevational view of the machine as seen from the left of Fig. 1.

Fig. 4 is a schematic circuit diagram corresponding in a general way to the device illustrated in Figs. 1–3.

Fig. 5 is a view from the left of the machine showing the rocking frame and associated parts underneath the work surface, certain parts having been removed for clarity of illustration.

Fig. 6 is a side elevational view of the roller electrodes, and a special work-feeding means having an electrical contact extending to the upper electrode, as seen from the left of Fig. 1.

Fig. 7 is a front elevational view showing the work-feeding means, the upper roller electrode, and means for driving this electrode.

Fig. 8 is a view showing the work-feeding means, as seen from above.

Fig. 9 is a view of the tuning stub, with means for controlling same, in elevation.

Fig. 10 is a longitudinal section of the tuning stub, including a portion of the coaxial cable.

Fig. 11 is a view of the tuning stub as same would be seen from beneath the machine.

Fig. 12 is a cross-sectional view of the tuning stub, at the plane 12—12 as shown in Fig. 9, including the coaxial cable, partly in longitudinal section, and a schematic representation of a source of high frequency electrical energy.

Fig. 13 is a cross-sectional view of the tuning stub, the section being taken in the plane 13—13 as shown in Fig. 9.

Fig. 14 is a view of one form of electrical connection to the upper roller electrode as seen from above.

Fig. 15 is a view from beneath the machine of a modified embodiment of the present invention, featuring a cylindrical extension of the lower roller electrode and a curved plate cooperating therewith to form a supplementary capacitor.

Fig. 16 is a view partly in elevation and partly in section of the same embodiment as that shown in Fig. 15, as seen from the left side of the machine.

Fig. 17 is a schematic circuit diagram corresponding in a general way to the embodiment of the invention illustrated in Figs. 15 and 16.

Figure 1:
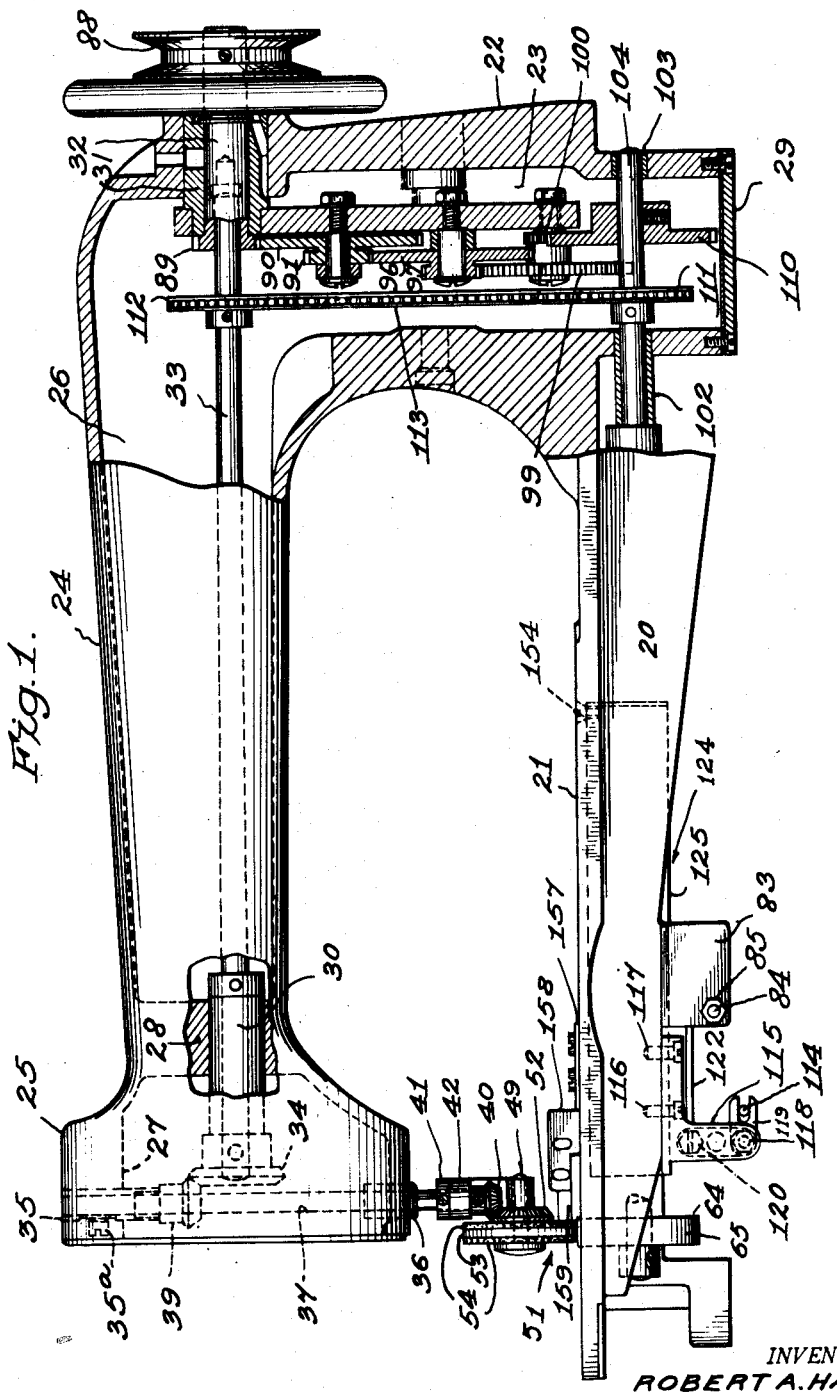

The apparatus of the present invention will include a pair of spaced electrodes, which may conveniently be in the form of upper and lower rollers, adapted for engaging between them the parts which are to be seamed, such as contacting sheets of plastic film. Means are provided for driving these rollers, which advance the work, and means are also provided for establishing between the rollers a high frequency electrostatic field. At least one of the rollers is yieldingly urged toward the other, but provision is made that the rollers at no time come into direct contact one with the other. Sheets of dielectric, when subjected to the high frequency field between the rollers, will by well known principles be heated throughout. At least one of the sheets should be of a material which becomes plastic and tacky when subjected to heat, and under these conditions, the sheets of dielectric, being in contact and somewhat under pressure, will become fused together in the region which passes between the rollers.

It will be understood that the present apparatus could also be used to unite two sheets of plastic material separated by a thermoplastic adhesive. It will also be understood that the electrodes need not necessarily be in roller form, and that the work could be advanced by other means. The mechanical and electrical apparatus will now be described in detail.

More specifically, the apparatus may be described as follows:

Reference is made to Fig. 1. There is provided a metallic base 20 having a work surface 21. Rising from the right-hand side of the base, as shown, is a hollow vertical standard 22 having an interior cavity 23. Integrally formed with standard 22 at its upper end is a hollow arm 24 which over-reaches the base 20 and terminates in a hollow head 25. Arm 24 and head 25 have interior cavities 26 and 27, respectively, isolated by a transverse partition or wall 28. Cavity 26 of the arm 24 communicates at its right-hand end directly with cavity 23 of the vertical standard 22. The standard 22 is provided with a portion extending below the work surface 21, and this portion is closed at its lower end by a cover plate 29 so as to form within the standard 22 a lubricant reservoir for transmission means to be described.

Mounted in the wall 28 is a bushing 30. Mounted in the right-hand wall of the standard 22 is a bushing 31, and journalled in this bushing is a stub shaft 32. Journalled in bushing 30 and in stub shaft 32 is a rotary shaft 33 extending longitudinally through arm 24. As shown, an end of this shaft 33 protrudes into the head 25 and carries a bevel gear 34. Mounted in the upper and lower walls of the head 25 are a pair of bushings 35 and 36, respectively, and journalled for rotation in these bushings is a generally vertical rotary shaft 37. The bushings and shaft are adapted to allow the shaft to be shifted upward vertically by means to be described. The shaft 37 is provided with a lengthwise key 38 as shown in Fig. 3, and mounted on this shaft but not rigidly attached to it is a bevel gear 39 provided with an internal slot cooperating with the key 38 of the shaft 37. The gear 39 cooperates with the gear 34 and is driven thereby, and in turn, by the key and slot arrangement, drives the shaft 37. The bushing 35 is held in place in the head 25 by a set screw 35a, and the lower end of this bushing engages the upper surface of a hub portion of the gear 39 and holds this gear in engagement with the gear 34. The bushing 35 is provided with a longitudinal bore throughout its length, with an enlarged bore portion toward its lower end, to provide clearance for the key portion of the shaft when this shaft is shifted upward. The gear 39 thus does not shift vertically, but the shaft 37 is shifted within it and within the bushing 35, without disturbing the positive driving action of the gear 34 with respect to the gear 39 and the shaft 37. At its lower end, the shaft 37 extends outside head 25, and mounted on said shaft at this end is a bevel gear 40. Mounted on the shaft 37 in a spaced relation from the gear 40 is a collar 41. Between the collar 41 and the gear 40 is a portion of a bracket 42 through which the shaft 37 passes. This bracket cooperates with the said gear and said collar in maintaining the upper electrode assembly at the right height, in a manner to be described.

Reference is made to Fig. 3. The bracket 42 is rigidly mounted on a presser bar 43 at the lower end of said bar. This bar is guided for vertical yielding movement in the lower wall of the head 25 and in a knurled pressure adjustment knob 44 which is threaded into the upper wall of the head 25. Coiled around the bar 43 is a spring 45. The lower end of the knob 44 engages the upper end of said spring, and a collar 46 mounted on the bar in a spaced relation with respect to the lower end of knob 44 engages the lower end of said spring. Below collar 46 and in a spaced relation therefrom is a stop collar 47 mounted on bar 43. This stop collar is adapted for engaging the lower wall of the head 25 and preventing the upper electrode from contacting the lower electrode, as will be described.

Reference is made to Figs. 1 and 3. The bracket 42 is provided with an extension having a horizontal bore for receiving a stud pin 49, which is secured in place by a set screw 50. Journalled on this stud pin is an upper roller electrode 51. Pressed into a side of the electrode 51 is a bevel gear 52 which cooperates with the bevel gear 40 to drive the electrode 51.

The electrode 51 comprises a brass core section 53 having fixed thereto at its outer edges two driving rings 54 of dielectric material. These ring portions of the upper roller electrode cooperate with the lower electrode roller, to be described, in advancing the material to be bonded. The portion immediately underneath the brass portion 53 will be softened by the heating effect of the high frequency electrostatic field, but since there is relatively little field immediately underneath the dielectric driving rings, these rings will contact firmer regions of the material, and since the rings have a satisfactory traction with respect to the material, they are of considerable assistance in feeding it between the electrodes.

Means are provided for lifting the upper roller electrode when desired. Mounted on the rear of the horizontal arm 24 by means of a shoulder screw 55 is a lever 56 as shown in Fig. 3. Pivotally connected to one end of this lever is a downwardly extending rod 57. Pivotally mounted on the base 20 as shown in Fig. 2 by means of a shoulder screw 57a is a conventional knee press or crank 58 having two radially extending arms 58a and 58b. The lower end of rod 57 is pivotally connected to the arm 58a of this crank, and the other arm 58b is adapted for use as a knee press control by the operator in order to lift the upper electrode. The other end of the lever 56 is pivotally connected to one end of a link 59 by a shoulder screw 60, as shown in Fig. 3. The other end of the link 59 is connected by a shoulder screw not shown, to a sleeve 61 which is slidably mounted on the bar 43 in a spaced relation between collars 46 and 47. Sleeve 61 has a key-like arm 62 which extends rearwardly through a slot in a wall of the head 25 for guiding the sleeve. By operating the knee press, the operator may cause the rod 57 to move downwardly, thereby rocking the lever 56 which, by means of the link 59 causes the sleeve to move upwardly. This sleeve engages the collar 46 and in turn lifts the presser bar 43 upwardly against the spring 45. The bracket 42 engages the collar 41 on the shaft 37, and this shaft is shifted upwardly within its bushings and within the gear 39 by means of the key and slot arrangement described. The upper roller electrode 51 is moved upward as the bracket 42 moves upward, as desired by the operator, for the introduction of material between the electrodes or for other purposes.

Attached to the lever 56 near the same end as is the link 59 is one end of a spring 63. The other end of the spring is attached to the arm 24, and when the apparatus is in a normal operating position, this spring tends to maintain the lever 56 in the proper position.

Reference is made to Figs. 1, 2, 3 and 5. Cooperating with the upper roller electrode 51 is a lower roller electrode 64 comprising a brass shell 65 pressed onto a dielectric core member 66, which in turn is mounted on a shaft 67, by means of a hub or sleeve 68. The core member 66 may be attached to the hub by being pressed onto same, and the hub is fastened to the shaft with screws. The hub may be of metallic construction, but the outer shell 65 is insulated from the hub and from the shaft 67 by the dielectric core member 66. The shaft 67 is journalled in a bearing 69 pressed into one end of a rocking frame 70. Fixed to the shaft 67 is a collar 71 which by engaging an end of the bearing 69 prevents endwise movement of the shaft 67 toward the right as shown in Fig. 2.

The other end of the rocking frame 70 is fastened to a shaft 72 by screws 73 and 74. The base 20 is provided with extensions adapted to hold a pair of spaced bearings 75 and 76 fixed in place by screws 77 and 78, and the shaft 72 is journalled in these bearings. Endwise movement of the shaft 72 is prevented by a pair of spaced collars 79 and 80 adapted for engaging bearings 75 and 76. Threaded into one end of the rocking frame 70 is a notched rod 81, and one end of a spring 82 is adjustably attached to this rod. The frame is provided with a downwardly depending lug or projection 83, and mounted on this lug is a tension-adjusting screw 84, locked in place by lock nuts 85. The other end of the spring 82 is attached to the tension-adjusting screw 84, and the tension in this spring urges rocking frame 70 to pivot on the shaft 72 in a counterclockwise direction as seen in Fig. 3, thereby urging the lower roller electrode upward.

Threaded into the rocking frame 70 near the same end as that at which shaft 67 is mounted is a stop screw 86 held in place by a lock nut 87. This screw is adapted for engaging the base and limiting the upward motion of the lower electrode, so that the two electrodes will not come into direct contact with one another.

The upper and lower roller electrodes are driven at equal speeds by a system of gears and other linkages driven by a combination hand wheel and belt pully 88 which is mounted on the outer end of the stub shaft 32, as shown in Fig. 1. The other end of this shaft protrudes into the cavity 23 of the standard 22. Secured to this end and formed integrally therewith is a small spur gear 89 which drives a suitable train of gears such as 90, 91, 96, 97, 99, and 100.

Reference is made to Figs. 1 and 2. Mounted in the left and right walls of the portion of the standard 22 below the work surface 21 are a pair of bearings 102 and 103, respectively, and journalled in these bearings is a rotary shaft 104. In one position of the rocking frame 70 the shaft 67 on which the lower electrode is mounted is approximately in line with shaft 104. The shaft 104 extends through the bushing 102 outside the standard 22 and has at its free end a universal coupling member 105 which cooperates with a similar coupling member 106 mounted on an end of a shaft 107 having at its other end a universal coupling member 108 which cooperates with a similar coupling member 109 mounted on an end of the shaft 67 opposite to that on which the lower roller electrode is mounted.

Mounted on the shaft 104 within the cavity 23 of the standard 22 is a large spur gear 110 which is driven by the spur gear 100. Also mounted on the shaft 104 is a sprocket 111. Generally in line with this sprocket and mounted on the shaft 33 is a similar sprocket 112, linked to the sprocket 111 by a chain drive 113. The hand wheel and belt pulley may be driven manually or by a belt from an electric motor-transmitter unit. It is assumed in the present illustration that such a unit is provided. Rotation of the pulley drives, through the gear arrangement described, the shaft 104, which in turn through the sprocket and chain arrangement drives the shaft 33 at an equal speed. The shaft 104 drives the lower roller electrode mounted on the shaft 67 through the universal couplings and the shaft 107, and the shaft 33 drives the upper roller electrode at the same speed as the lower electrode through the bevel gears described.

In the illustrated embodiment, as stated, the lower roller electrode is yieldingly urged upward with less tension than that with which the upper roller electrode is urged downward. Thus when a cross seam or other variation in aggregate thickness of the parts being bonded reaches the electrodes, the lower roller electrode will move downward, being free to do so because of the universal couplings in the shafts by which this electrode is driven. Reference is made to Figs. 1–3, 5 and 9.

An L-shaped rod 114 is attached at its one end to the lower side of the rocking frame 70, at one end of said frame, and projects therefrom. A generally L-shaped bracket 115 is fastened to the base 20 by screws 116 and 117, and an arm of said bracket projects beneath the base. Pivotally supported on said arm toward its free end by means of a shoulder screw 118 is a bell crank lever 119, having a generally horizontal, forked arm, and a generally vertical arm. The free end of the rod 114 engages the forked arm of the bell crank lever 119. Pivotally attached to the other arm of the bell crank lever by a shoulder screw 120 is a collar 121. The collar 121 is adjustably connected to a rod 122 near one end of said rod by means of a set screw 123. When a thick portion of material moves between the electrodes, the lower electrode 64 will move downward slightly, and since the shaft on which it is mounted is carried by the rocking frame 70, this frame will pivot about the axis of the shaft 72, and the L-shaped rod 114 will move downward. This rod will urge the forked arm of the bell crank lever 119 downward, and as a consequence, the other arm of this lever will be urged toward the right as shown in Fig. 1. Rod 122, driven by this arm, will also be moved to the right, and the position of this rod controls, by means to be described, the output power of the apparatus.

The apparatus includes a source of high frequency electrical energy, and means for coupling energy from this source to the roller electrodes. In the present illustration, the coupling means includes a coaxial transmission line connected to the source, a "tuning stub" connected to the transmission line, and electrical connections from the tuning stub to the electrodes.

It is recalled that in general when power is supplied from an electrical source to a load, the power supplied to the load is a function of the impedance of the load. In the present apparatus, the load represented by the dielectric sheets between the electrodes may be considered equivalent to a capacitance in parallel with a large resistance. The tuning stub of the present apparatus includes a portion which introduces an inductive impedance in parallel with the electrodes, and also includes a movable element which introduces a variable capacitance in parallel with the electrodes. In the preferred mode of operation, the total capacitance of this equivalent parallel circuit is somewhat too great to resonate with the inductance. In general, the purpose of the variable capacitance mentioned is to provide means for varying the tuning of the equivalent parallel circuit and thereby control the output power, that is, the rate at which energy is supplied to the material between the electrodes. Since the movable condenser is controlled by elements responsive to the thickness of the material between the roller electrodes, the power supplied to this material will be automatically controlled in response to variations in the thickness of the material. The electrical properties of the apparatus will be discussed in further detail following the description below of the constructional details of the tuning stub.

The tuning stub which is generally indicated by the numeral 124, is shown mounted under the base in Figs. 1 and 2, and in other views in Figs. 9–13, to which reference is now made. As shown in Fig. 10, the stub comprises an outer metallic cylinder or conductor 125 and an inner coaxial cylindrical rod or conductor 126. At the right hand end of the stub as shown in Fig. 10 is a metallic plate 127 fixed to the cylinder 125 by a screw 128. The inner conductor 126 of the stub is supported at this end by the plate 127, to which it is affixed by a screw 129. The inner conductor 126 has, for the sake of mechanical convenience in assembly, a portion 126a of reduced diameter toward its other end, and is supported at this end of the stub by a dielectric ring 130, the conductor extending through this ring and out of the stub.

The source of high frequency electrical energy, which may be generally indicated by the numeral 130a, is shown in Fig. 12. This source is itself energized through a pair of leads 130b. Direct current may be supplied to it through these leads. Alternating current may be used, in which case the apparatus 130a may include rectifier means. The coaxial cable, which may be generally indicated by the numeral 131, shown in Figs. 10 and 12 but omitted in other figures, connects the high frequency source 130a to the stub 124 at a point near the plate 127. This point of connection may be generally indicated by the numeral 132. The coaxial cable has an inner conductor 133 which is connected to the inner conductor 126 of the stub 124 by a screw 134. The cylinder 125 may be provided with a hole 134a, shown in Fig. 9, through which, in assembling the apparatus, a screwdriver may be inserted for tightening the screw 134. The cable 131 has an outer conductor which may comprise a copper mesh 135 separated from the inner conductor by insulating material 136 and having an outer sheath or covering of insulating material 136a. Extending into and in electrical contact with the mesh outer conductor 135 of the cable is a section of brass tube 137. This tube is soldered to a curved brass plate 138, as shown in Figs. 10 and 12, which is fastened by screws 139 and 140 to the outer cylinder or conductor 125 of the tuning stub.

Mounted on the reduced portion 126a of the inner conductor 126 of the stub 124 is an enlarged solid metallic cylinder 141, secured to the conductor 126 by a screw 142. This cylinder, as well as the inner and outer conductors of the tuning stub, and the plate 127, may satisfactorily be of brass.

There is provided within the tuning stub a slidable brass or other metallic sleeve 143, dimensioned to have a sliding fit with the inside wall of the cylinder 125. The sleeve 143 is pressed onto a dielectric insulator sleeve 144, dimensioned to have a sliding fit over the cylinder 141. The sleeve 143 together with its dielectric sleeve 144 comprises a variable condenser adapted for varying the capacitance between the inner conductor 126 and the outer conductor 125 of the tuning stub.

The outer cylinder 125 of the tuning stub is provided with a lengthwise slot 145, as shown in Fig. 11, and mounted in this slot is a runner 146, fastened to the sleeve 143 by a pair of screws 147 and 148.

The runner 146 is provided with a downward extension 149, as shown in Fig. 9, and pivotally mounted on this extension by means of a shoulder screw 150 is the previously-mentioned rod 122, the motion of which is controlled by the motion of the lower electrode when a thick portion of material passes between the electrodes.

Toward its lefthand end as shown in Fig. 9, the outer cylinder 125 of the tuning stub 124 is provided with a bracket extension 151. As shown in Figs. 1 and 2, the stub is mounted on the base 20 by means of this bracket portion and a pair of screws 152 and 153, and also a screw 154, passing through the base 20 from the work surface 21 and engaging the cylinder 125 toward its righthand end.

The position of the stub with respect to other elements can be seen in Fig. 2. Connected to the inner conductor 126 of the tuning stub at its end which projects through the dielectric ring, by means of a screw 155, is a set of thin brushes 156, as of thin copper strips. These brushes are adapted to contact the brass shell 65 of the lower roller electrode 64. The outer conductor 125 of the tuning stub is connected or grounded to the base of the apparatus by the bracket 151 and screws 152, 153 and 154. As shown in Fig. 1, attached to the base is a bracket 157, having an upstanding extension 158, to which is attached a thin copper brush contact 159. This brush is adapted to engage the inner brass core portion 53 of the upper roller electrode 51. The bracket 157 and its associated elements are also shown in Fig. 14, a plan view. An electrical connection is thus provided from the outer conductor of the tuning stub through the base, through the bracket 157, its extension 158, and the brush 159, to the inner brass portion of the upper roller electrode. As stated, an electrical connection is provided from the inner conductor of the tuning stub through the brushes 156 to the brass shell of the lower roller electrode.

Turning now to the electrical properties of the apparatus and referring to Fig. 10, it is to be pointed out that the distance from the point 132, where the cable is connected to the tuning stub, to the plate 127 is less than a quarter wave length at the frequency used. The plate 127 provides a short-circuit between the inner and outer conductors of the tuning stub at the point where the plate is mounted, and in accordance with well known principles, an inductive impedance will be seen at point 132 looking toward the short-circuited end of the stub at which plate 127 is mounted. This end may therefore be referred to as the inductive end of the stub. Also in accordance with well known principles, an inductive impedance would also be seen looking in this direction if the distance from the point 132 to the plate 127 were increased by any integral number of half wave lengths. Actually, in the illustrated embodiment the distance mentioned is a great deal less than a quarter wave length, for example, about one-sixtieth wave length.

It is to be noted that while the base 20 of the machine comprises a part of the electrical circuit from the outer conductor of the tuning stub to the upper electrode, it does so for only a short distance, since the output or left-hand end of the tuning stub is located beneath the base 20 at a point relatively close to the roller electrodes. The brushes 156 and 159 are purposely short so as to minimize stray capacitance effects. Continuing the electrical analysis, the variable condenser or capacitor represented by slidable sleeve 143 and the fixed cylinder 141 may for the moment be disregarded. The effective distance from point 132 to the electrodes may in the present illustration be assumed to be of the order of an eighth wave length, and the predominantly capacitive impedance of the load between the roller electrodes presents a predominantly capacitive impedance as seen from point 132 looking toward the electrodes. The material between the electrodes then appears at point 132 to be equivalent to a capacitance in parallel with a resistance.

The variable condenser mentioned is observed to be in parallel with the electrodes, and as seen from point 132, it will present a capacitive impedance. Thus looking into the tuning stub from the coaxial cable at point 132, there is seen the equivalent of a parallel circuit comprising an inductance in parallel with a resistance and two parallel capacitance elements.

In the present apparatus it is observed that the position of the slidable sleeve 143 for a given separation of the electrodes may initially be adjusted by means of the set screw 123. In the preferred mode of operation the position of the sleeve 143 is initially adjusted so that the net impedance looking into the tuning stub at point 132 from the cable is on the capacitive side of resonance—that is, in the equivalent parallel circuit mentioned, the capacitive component of admittance is greater than the inductive component of admittance. Thus a reduction of capacitance would be necessary in order to bring the circuit more nearly into parallel resonance. The circuit constants of the illustrative apparatus are such that increased power is delivered to the load when the tuning stub aproaches resonance. This results from the fact that as the stub approaches resonance the impedance looking into the stub more nearly approaches a match with the impedance looking toward the source from point 132. The impedance looking toward the source is related to such circuit constants as the internal impedance of the source, the characteristic impedance of the cable, the length of the cable, and the means coupling the source to the cable. Satisfactory operation of the apparatus is possible, even if a perfect impedance match does not exist at resonance of the stub. During operation of the apparatus, when a thicker portion of material passes between the electrodes, they will separate by a greater distance, which will somewhat reduce the capacitance between them. As a result, the capacitive component of admittance as seen looking into the tuning stub at point 132 will be reduced, bringing the stub more nearly into resonance. Hence more power will be delivered from the cable into the stub and more power will reach the material between the electrodes. This increase of power which results from the decreased capacitance at the electrodes is not, however, usually sufficient to provide an adequate automatic regulation of power output. When the lower electrode moves downward in yielding to thicker portions of material, as previously stated, the sleeve 143 will be moved toward the right as shown in Figs. 2 and 10. It is assumed that the sleeve is positioned somewhat toward the right of cylinder 141, as in Fig. 10, and hence motion of the sleeve toward the right will decrease the extent to which it overlaps the cylinder 141 and hence decrease the capacitance which it introduces between the inner and outer conductors of the stub. This decrease in capacitance will supplement the decrease of capacitance caused by the increase in thickness of the material, and hence will increase the power transmitted into the stub and to the load. As shown in Fig. 9, it is observed that the ratio of movement of sleeve 143 for a given movement of the lower electrode can be changed by changing the effective length of the arm of the bell crank lever 119 to which the rod 122 is attached. The bell crank lever is provided with a hole 160 for this purpose. Such a change in ratio is ordinarily necessary only when the type of material being bonded is changed. If the ratio of movement of sleeve 143 is proper, then for a considerable range of thickness of the material being bonded, the power output to the material will be automatically regulated so to provide the proper heating and softening for satisfactory bonding, as desired.

Fig. 4 illustrates very schematically the circuit of the embodiment described in detail above. The oscillator 130c may be considered to correspond to the high frequency source 130a of Fig. 12. The elements 51c and 64c represent the upper and lower roller electrodes 51 and 64 shown in Figs. 1 and 3. The lower roller is shown as yieldable. Capacitance between these rollers is indicated by dotted lines in Fig. 4. The right-hand, short-circuited portion of the stub is shown as an inductance in Fig. 4, because, as explained, its apparent impedance as viewed from the point where the cable is connected to the stub is of this nature. There is illustrated a variable capacitor 143c in parallel with the electrodes, corresponding to the previously described capacitor having the slidable sleeve 143. Connecting the capacitor 143c with the yieldable electrode is mechanical linkage 119c, adapted to separate the plates of the capacitor 143c farther when the electrodes move apart.

As will be explained at a later point, the apparatus may be operated under conditions different from those described above, and different means may be used for varying the tuning.

It is to be noted that the electrical contact from the base of the machine to the upper roller illustrated in Figs. 1 and 14 is of primary application for edge seaming since its construction permits only a very limited amount of material to pass to the right side of the rollers. Figs. 6, 7, and 8 illustrate a modified type of electrical contact, comprising an upwardly extending blade-like contact or brush 161 mounted on a double lap seam feller folder 162, of the type described in Patent 1,712,964 granted to Joseph Mann on May 14, 1929.

The blade-like contact 161 is pressed against the circumferential portion of the core section 53 of the upper roller electrode 51, as shown. With this type of contact and folder, complete passage of the material on either the left or the right-hand side of the upper roller electrode is permitted. A double lap seam is formed with this type of folder, reference being made to Patent 1,712,964 for details of its construction. Other types of work guides may be used, and the teachings of the present invention may be applied in forming any type of seam.

Figs. 15 and 16 illustrate a modification including a different type of automatically controlled capacitor in parallel with the electrodes. In this modification the previously described tuning stub may also be used, and its slidable sleeve positioned manually as a secondary control. The equivalent circuit seen looking into the tuning stub from point 132 will be a resistance and a capacitance corresponding to the parts between the electrodes, an inductance corresponding to the short-circuited section of the stub, a capacitance corresponding to the slidable sleeve device, and a capacitance corresponding to an automatically variable capacitor, to be described, all connected in parallel. It may again be assumed that the equivalent parallel circuit is normally tuned so that there is an excess of capacitance, as compared with a resonant condition, and that the purpose of the automatically variable capacitor is to supplement the decrease of capacitance in the parallel circuit caused by thicker portions of material passing between the electrodes, so that the overall effect will be to increase by a satisfactory amount the power supplied to thicker portions of material.

In the modification shown in Fig. 15, it is to be observed that the hub 68 is arranged to extend toward the right of the lower roller electrode, and the outer shell 65 is provided with a tubular brass extension 163 extending toward the left of the electrode. Rotatably mounted on the shaft 72 is a block 164. Endwise motion of this block on the shaft 72 is prevented by the collar 79 and the bearing 75, between which the block 164 is disposed. Attached to the block by a set screw 165 is a plate 166, provided at its free end with a curved portion 166a, which, together with the tubular brass extension 163, forms a capacitor. Electrical contact from the outer conductor 125 of the tuning stub 124 is made to the plate 166 at the end of its curved portion 166a by a generally flat brass spring contact 167, attached by a pair of screws 168 and 169 to the base 20 and the bracket extension 151 of the tuning stub 124.

An adjusting thumb screw 170 is threaded into the base 20 on the lower side thereof, and is provided with two flange portions 170a and 170b. Rigidly attached to the plate 166 and extending therefrom is a rod 171, which is engaged between the flange portions 170a and 170b of the screw 170. The initial separation between the curved portion 166a of the plate 166 and the tubular extension 163 of the shell of the lower electrode may be controlled manually by the thumb-screw 170.

In this modification, it is unnecessary to use the previously described automatic positioning of the slidable sleeve 143 of the tuning stub as thickness of the material varies. For this reason it is possible to omit means for positioning this sleeve responsive to the motion of the rocking frame 70, such as the L-shaped rod 114, the bell crank lever 119, and the rod 122. The slidable sleeve 143 may be initially positioned manually by means of the extension 149 to set the power output in the proper range, and thereafter need not be adjusted, so long as the same type of material is being bonded. When thicker portions of material pass between the roller electrodes, the lower roller electrode will move downward, thereby decreasing the capacitance between the extension 163, and the portion 166a of the plate 166. Since the portion 166a is electrically connected with the outer conductor of the tuning stub, and since the extension 163 is electrically connected to the brass shell of the lower roller electrode and thence by the brush contact 156 to the inner conductor of the tuning stub, the capacitance between the inner and outer conductors of the tuning stub at its output end, and hence at the point 132, is decreased. For the reasons given above, this decrease of capacitance will bring the tuning stub more nearly into resonance and hence will increase the power output of the apparatus to the material between the electrodes, as desired. The area and shape of the curved portion 166a of the plate 166 will be predetermined so that once the proper initial settings of the slidable sleeve and the plate 166 are made, various thicknesses of material may be sealed without further manual adjustment of the apparatus.

Fig. 17 illustrates schematically a circuit diagram approximately corresponding to the embodiment of the invention shown in Figures 15 and 16. There is provided an upper roller electrode 51d adapted to rotate about a normally stationary axis, a stationary curved plate 166d, electrically connected to this electrode, a yieldable lower roller electrode 64d, mechanically and electrically connected to a rotary tubular member 163d cooperating with the curved plate 166d to form a variable capacitor. Further explanation of Fig. 17 is believed unnecessary in the light of the previous description.

Another modification of the first-described embodiment, not involving the curved plate and cylindrical extension, would involve changing the stub from its horizontal position, as shown in Figs. 1 and 2, to a generally vertical position. With this arrangement, the slidable sleeve 143 of the stub could be automatically positioned in response to the motion of the rocking frame 70 by a direct linkage from extension 149 of the sleeve to the rocking frame, or to a sleeve which might be mounted on the shaft 67. This construction would eliminate the necessity for transforming vertical motion into horizontal motion by the bell crank lever 119 and its associated elements. It is apparent that the elimination of the bell crank lever removes the means thereby provided for controlling the ratio of movement of the slidable sleeve as compared with that of the lower electrode and rocking frame. The vertical arrangement of the tuning stub with the direct linkage described, while giving satisfactory operation through a limited range of thicknesses of material, does not provide as great a range or flexibility of operation as the first-described embodiment.

It is to be understood that the device could be modified so that the upper roller electrode has less tension than the lower electrode, and will yield with variations in thickness of the material. The automatic tuning could then by appropriate linkages be made responsive to motion of the upper electrode.

In the illustrated embodiments of the invention the tension on the lower roller electrode may be controlled by adjustment of the position of the spring 82 on the notched rod 81.

While in the illustrated embodiments described above it has been assumed that the tuning stub is initially adjusted so that there is too much capacitance for resonance, and while it has further been assumed that the apparatus was arranged to reduce the capacitance in parallel with the electrodes when thicker portions of dielectric sheets are in the region of the electrodes, it is to be understood that the teachings of the present invention are not necessarily limited to this mode of operation. Thus, for example, it is possible to adjust the capacitance initially so that there is too little capacitance for resonance at the frequency of the source, and to arrange the device so that when an increased thickness of material passes between the electrodes, the capacitance in parallel with the electrodes is increased, thereby bringing the circuit more nearly into resonance and consequently increasing the power output. Reference is made to Fig. 10. This could be accomplished, for example, by changing the construction of the stub so that the sleeve 143 normally overlaps the cylinder 141 from the left; thus the motion of the cylinder to the right with an increased thickness of material would cause an increased region of overlap. In this mode of operation the changes of the variable capacitor would be opposite to changes of capacitance immediately between the electrodes, as distinguished from the previously described, more preferable arrangement in which these changes are additive.

It is to be understood that variable impedance devices may also be placed in series with the load instead of or in addition to the parallel arrangement in order to control the power output of the apparatus.

In analyzing or describing the illustrated embodiment, it is apparent that the variable impedance device which controls the power delivered to the dielectric parts may be considered as a part of a tunable or adjustable coupling means between a high frequency source and a load. Alternatively, instead of considering the coupling means tunable, the apparatus may be considered to include a high frequency source coupled to a tunable load, which load in turn includes the electrodes with the dielectric parts therebetween, and one or more variable impedance devices connected as described. In either case, means responsive to the aggregate thickness of dielectric parts are provided for controlling the variable impedance devices.

It is of course to be understood that under certain circumstances other types of conductors could be used than coaxial cable. Thus at high frequencies, it may be possible to use a wave guide.

It is further to be understood that in the present invention various arrangements other than a less-than-quarter-wave-length short-circuited section could be used to obtain an inductive impedance, such as an open-circuited section of conductor the length of which is between one-fourth and one-half wave length, or the equivalent. Similarly, other types of variable capacitors could be used.

It is to be understood that the present invention, in addition to comprising improved apparatus, comprises a new and useful method for bonding together dielectric parts with high-frequency electrical power by determining the aggregate thickness of said parts and controlling said power as described above.

From the foregoing it is believed that the construction, operation and advantages obtainable by the practice of our instant invention will be readily understood by persons skilled in the art. It is to be borne in mind, however, that various changes in the apparatus herewith illustrated and described—such as for example the provision of means other than the electrodes themselves responsive to the aggregate thickness of the parts being bonded, for controlling the variable capacitor—may be resorted to without departing from the spirit of the invention or the scope of the subjoined claims.

We claim:

1. Apparatus for bonding together dielectric parts, including spaced means comprising a plurality of electrodes and adapted for receiving said parts therebetween, a source of high frequency electrical energy, said means being adapted to engage the outer surfaces of said parts at a point generally in the region where they are to be bonded together, at least a portion of one of said means being yieldingly urged toward a portion of the other means and adapted for variable positioning in response to variations in the aggregate thickness of said parts at said point, an enclosed conductor coupling said electrodes to said source, said electrodes together with said parts therebetween presenting an impedance which changes with variations in the aggregate thickness of said parts, a variable impedance device within said enclosed conductor connected in parallel with said electrodes, and means controlled by said first-mentioned portion adapted to vary said variable impedance device in such a direction as to produce impedance changes in the same direction as the changes in the impedance between said electrodes produced by variations in the thickness of said parts.

2. Apparatus for bonding together dielectric parts, comprising a plurality of electrodes adapted for contacting outer surfaces of said parts, at least one of said electrodes being yieldingly urged toward the other and separable from the other responsive to the thickness of said parts, said electrodes themselves comprising a capacitor the capacitance of which is less when said electrodes are separated by thicker regions of said parts than when thinner regions are between said electrodes, said apparatus also comprising a source of high-frequency electrical energy, an enclosed conductor for coupling energy from said source to said electrodes, an inductive element and a variable capacitor in a parallel circuit with said electrodes, said variable capacitor having, as one of its plates, a movable member within said conductor, the total capacitance of said parallel circuit being greater than enough to produce parallel resonance with its inductance, and movable means responsive to increases in thickness of said parts in the region of said electrodes for decreasing the capacitance of said variable capacitor so as to bring said parallel circuit more nearly into resonance, thereby increasing the rate at which energy is supplied to said parts in thicker regions of the same.

3. Apparatus for bonding together dielectric parts comprising a plurality of separable electrodes adapted for receiving said parts therebetween, a high-frequency oscillator, means including an enclosed conductor coupling said electrodes to said oscillator, a variable impedance device within said enclosed conductor adapted to tune the load presented to said oscillator, a member movable with one of said electrodes in response to variations in the thickness of said parts, a bell crank lever having one arm driven by said movable member and having its other arm mechanically coupled to said variable impedance device and adapted to move it in a direction to increase the power supplied to thicker portions of said parts, and means for adjusting the effective length of one of said arms.

4. A seamer for bonding together dielectric sheets of varying thickness comprising a base, a plurality of roller electrodes adapted for receiving and gripping said parts therebetween, a drive for continuously rotating at least one of said electrodes to advance said parts, a rockable frame pivotally mounted on said base, one of said electrodes being carried by said frame, said frame being yieldingly urged to rock in such a direction as to move said last-mentioned electrode toward another of said electrodes in response to decreases of the thickness of said parts in the region of said electrodes and being adapted for yielding motion in the opposite direction in response to increases of said thickness, a source of high frequency electrical energy, an enclosed conductor coupling said electrodes to said source, a variable capacitor within said conductor connected in a parallel circuit with said electrodes capable of varying the rate at which energy is supplied to said parts between said electrodes, and means connecting said rockable frame to said capacitor for controlling its capacitance so as to cause energy to be delivered at a greater rate to thicker regions of said parts than to thinner regions.

5. Apparatus for bonding together dielectric parts of varying thickness comprising a base, a plurality of electrodes adapted for receiving and gripping said parts therebetween, a rockable frame pivotally mounted on said base, one of said electrodes being carried by said frame, said frame being yieldingly urged to rock in such a direction as to carry said last-mentioned electrode toward another of said electrodes for gripping said parts, a source of high frequency electrical energy, a coaxial transmission line coupling said electrodes to said source, an inductance device and a variable capacitor both connected in parallel with said electrodes, said variable capacitor being capable of decreasing the rate at which energy is supplied to said parts between said electrodes when its capacitance is increased, said variable capacitor comprising an enlarged segment of the inner conductor of said transmission line and a slidable sleeve electrically connected to the outer conductor, between the inner and outer conductor of said line, and means responsive to the motion of said rockable frame adapted to move said slidable sleeve in a direction to increase the capacitance of said variable capacitor when the electrode carried by said rockable frame moves toward said other electrode, so as to decrease the rate at which energy is supplied to said parts.

6. Apparatus for bonding together dielectric parts, comprising a plurality of electrodes adapted for receiving said parts therebetween, a source of high frequency electrical energy, a coaxial transmission line having an outer sleeve-like conductor and an inner axial conductor coupling said electrodes to said source, a section of coaxial transmission line one end of which is connected to said first-mentioned line so as to be in parallel with said electrodes, the other end of which is short-circuited, the length of said section being in effect less than a quarter wavelength so as to introduce an inductive impedance at its point of connection with said first-mentioned transmission line, said first-mentioned section of transmission line being provided with an internal variable capacitor in parallel with said electrodes, said variable capacitor comprising an enlarged cylinder mounted on and electrically connected to said inner conductor and a slidable sleeve electrically connected to said outer conductor, adapted for lengthwise motion between said cylinder and said outer conductor so as to vary the capacitance between said inner and outer conductor, said apparatus also including means responsive to the aggregate thickness of said parts in the region of said electrodes for positioning said sleeve so as to cause energy to be supplied to thicker regions of said parts at a greater rate than to thinner regions by tuning the parallel circuit represented by said inductive impedance, said variable capacitor, and the impedance of said electrodes with said parts therebetween.

7. Apparatus for bonding together dielectric parts comprising a plurality of separable electrodes adapted for receiving said parts therebetween, a high-frequency oscillator, means including an enclosed conductor coupling said electrodes to said oscillator, a variable impedance device within said enclosed conductor adapted to tune the load presented to said oscillator, a member movable with one of said electrodes in response to variations in the thickness of said parts, and a bell crank lever having one arm driven by said movable member and having its other arm mechanically coupled to said variable impedance device and adapted to move it in a direction to increase the power supplied to thicker portions of said parts.

ROBERT A. HAYES.
WILLARD C. RYKERT.

REFERENCES CITED

The following references are of record in the file of this patent:

UNITED STATES PATENTS

| Number | Name | Date |
|---|---|---|
| 2,147,689 | Chaffee | Feb. 21, 1939 |
| 2,236,998 | Gillette | Apr. 1, 1941 |
| 2,324,068 | Crandell | July 13, 1943 |
| 2,370,624 | Gillespie | Mar. 6, 1945 |
| 2,391,086 | Crandell | Dec. 18, 1945 |
| 2,396,004 | Gilbert | Mar. 5, 1946 |
| 2,432,412 | Hacklander | Dec. 9, 1947 |
| 2,434,330 | Merz et al. | Jan. 13, 1948 |
| 2,468,263 | Joy | Apr. 26, 1949 |

FOREIGN PATENTS

| Number | Country | Date |
|---|---|---|
| 375,587 | Great Britain | June 30, 1932 |
| 556,292 | Great Britain | Sept. 28, 1943 |